United States Patent
Park et al.

(10) Patent No.: US 7,889,172 B2
(45) Date of Patent: Feb. 15, 2011

(54) INPUT DEVICE OF MOBILE COMMUNICATION TERMINAL AND MOBILE COMMUNICATION TERMINAL USING THE SAME

(75) Inventors: Yeon Woo Park, Seoul (KR); Sang Yeon Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 977 days.

(21) Appl. No.: 11/383,396

(22) Filed: May 15, 2006

(65) Prior Publication Data

US 2006/0256930 A1 Nov. 16, 2006

(30) Foreign Application Priority Data

May 16, 2005 (KR) .................. 10-2005-0040762

(51) Int. Cl.
*G09G 5/08* (2006.01)
(52) U.S. Cl. .................. 345/156; 345/157; 345/158; 341/21; 341/22
(58) Field of Classification Search ......... 345/156–184; 341/21, 22
See application file for complete search history.

(56) References Cited

U.S. PATENT DOCUMENTS

| | | | | |
|---|---|---|---|---|
| 6,014,130 A * | 1/2000 | Yung-Chou | ............... | 345/163 |
| 6,259,433 B1 * | 7/2001 | Meyers | ............... | 345/161 |
| 6,332,024 B1 * | 12/2001 | Inoue et al. | ............ | 379/433.06 |
| 6,717,572 B1 * | 4/2004 | Chou et al. | ............... | 345/157 |
| 6,724,365 B1 * | 4/2004 | Escamilla et al. | ............ | 345/157 |
| 6,862,459 B2 * | 3/2005 | Sawada et al. | ............ | 455/550.1 |
| 6,961,593 B1 * | 11/2005 | Lonka et al. | ............ | 455/573 |
| 7,623,652 B2 * | 11/2009 | Mori et al. | ............... | 379/367 |
| 2003/0001816 A1 * | 1/2003 | Badarneh | ............... | 345/156 |
| 2005/0026658 A1 * | 2/2005 | Soejima | ............... | 455/575.1 |
| 2005/0062731 A1 | 3/2005 | Tseng | | |
| 2005/0119034 A1 * | 6/2005 | Kato et al. | ............... | 455/575.4 |
| 2005/0216557 A1 * | 9/2005 | Ohwa et al. | ............... | 709/204 |

FOREIGN PATENT DOCUMENTS

| | | |
|---|---|---|
| CN | 1292898 | 4/2001 |
| EP | 0901262 A2 | 3/1999 |
| EP | 1004957 | 5/2000 |
| EP | 1179944 | 2/2002 |
| KR | 10-2004-0092547 A | 11/2004 |
| WO | 01/46901 | 6/2001 |

* cited by examiner

*Primary Examiner*—Amare Mengistu
*Assistant Examiner*—Premal Patel
(74) *Attorney, Agent, or Firm*—Workman Nydegger

(57) ABSTRACT

An input device of a mobile communication terminal for successively and rapidly performing functions is disclosed. The input device includes a belt being successively slidable by an external force, a plurality of rollers being rotated by the sliding of the belt, a sensor unit for detecting the rotation of the roller, and a controller for executing at least one function according to an electric signal generated from the sensor unit.

19 Claims, 10 Drawing Sheets

ND MOBILE COMMUNICATION TERMINAL
INPUT DEVICE OF MOBILE COMMUNICATION TERMINAL AND MOBILE COMMUNICATION TERMINAL USING THE SAME

This application claims the benefit of Korean Patent Application No. 10-2005-0040762, filed on May 16, 2005, which is hereby incorporated by reference as if fully set forth herein.

BACKGROUND OF THE INVENTION

1. Field of the Invention

The present invention relates to a mobile communication terminal, and more particularly, to an input device of a mobile communication terminal capable of successively and rapidly performing a variety of functions and a mobile communication terminal using the same.

2. Discussion of the Related Art

Figure 1:
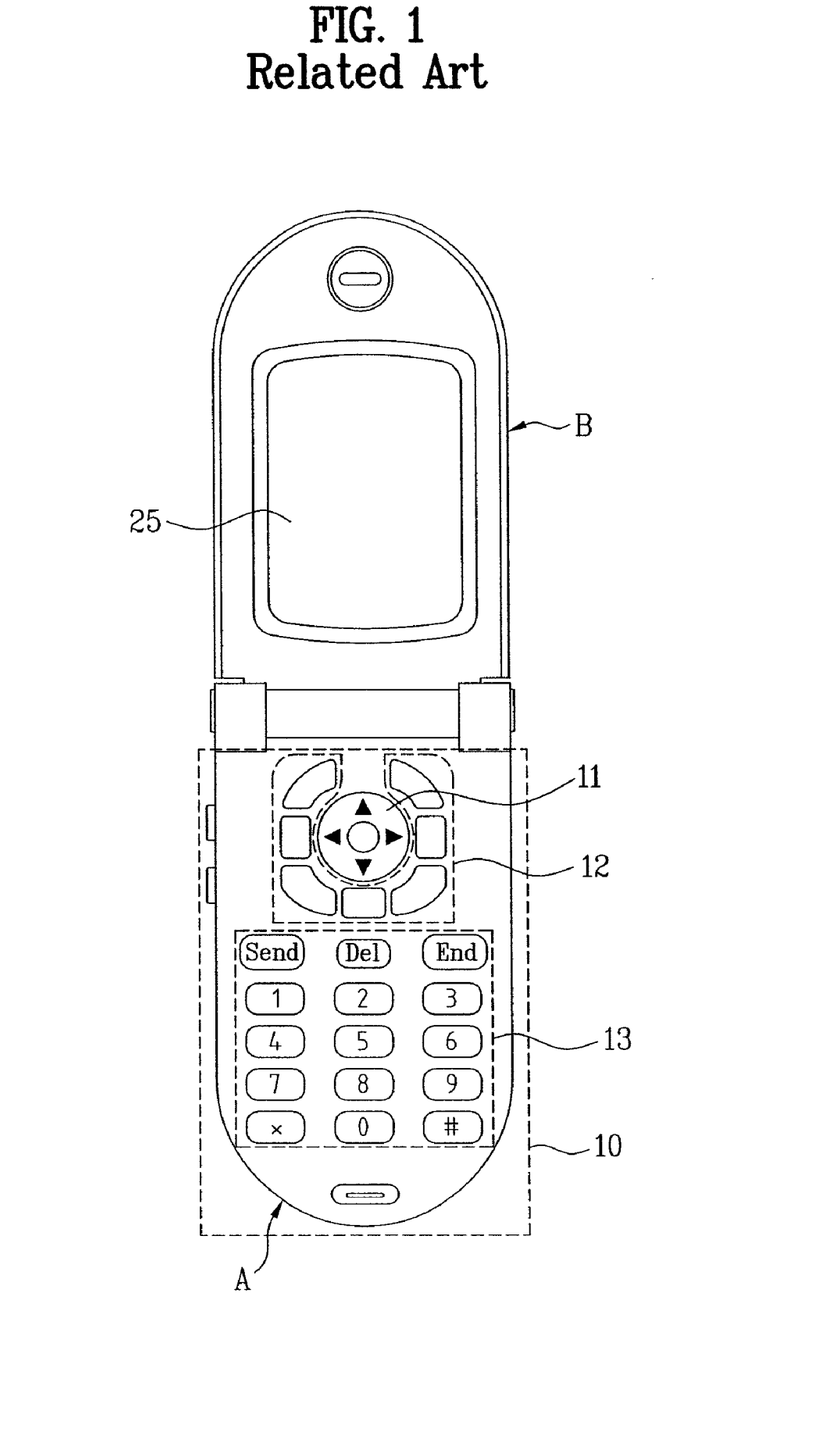
FIG. 1 illustrates a front view of a conventional mobile communication terminal.

FIG. 1 is a front view illustrating a conventional mobile communication terminal.

As shown in FIG. 1, the conventional mobile communication terminal roughly includes a main body A having a keypad 10 formed in the front side thereof and a folder B having a screen 25 for outputting images.

Here, the keypad 10 includes forward, backward, right, and left arrow keys 11 for changing the movement direction of a cursor when selecting a menu, shortcut keys 12 for operating calling, a phonebook function, and a camera, and character keys 13 for inputting numbers, characters, and special characters.

In order to operate the conventional mobile communication terminal, a user moves the cursor to a desired menu using the arrow keys 11 and executes function of the corresponding menu by using an enter key. At that time, the execution of the function is carried out by a controller 22 (See FIG. 2) of the conventional mobile communication terminal.

Figure 2:
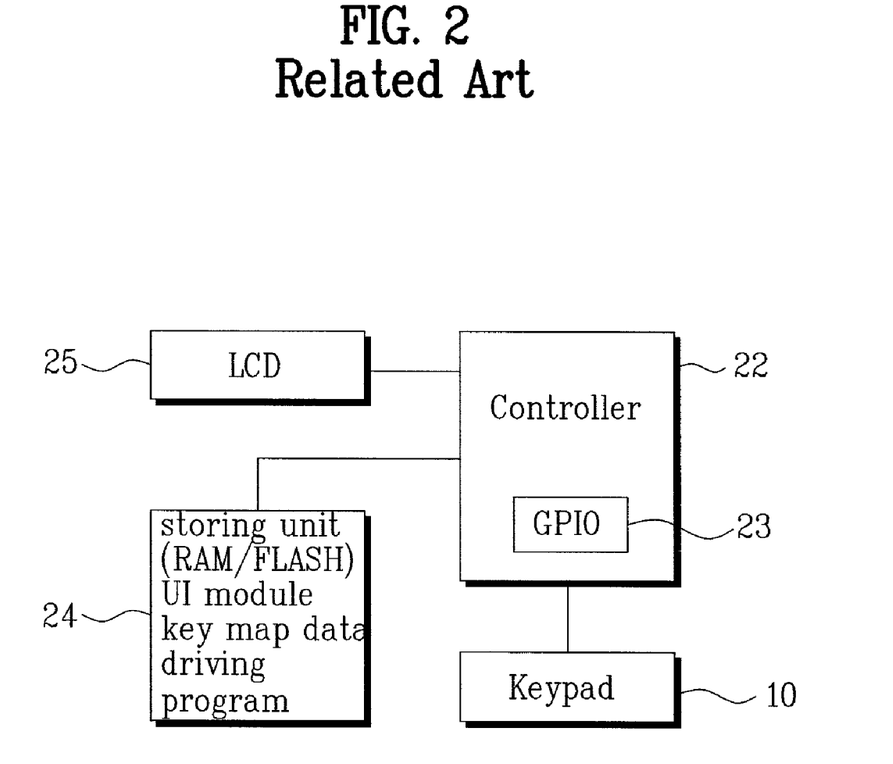
FIG. 2 illustrates a schematic block diagram of the conventional mobile communication terminal.

FIG. 2 is a block diagram schematically illustrating the conventional mobile communication terminal.

As shown in FIG. 2, the controller 22 of the conventional mobile communication terminal receives an input value from the keypad 10 through an input interface such as a general purpose input/output pin (GPIO) and interprets a control command of the corresponding key value by using key map data stored in a storing unit 24.

After that, the controller 22 uses the interpreted control command and executes a necessary function by reading a driving program corresponding to the interpreted control command from the storing unit 24. At that time, whether the driving program is executed or not is displayed on the screen 25 such as a liquid crystal display (LCD).

However, the conventional mobile communication terminal has a disadvantage as follows.

Firstly, when executing a desired function, the user uses the arrow keys 11 to move the cursor discretely. Thus, it is difficult to search sequential data and to manipulate for error correction.

Moreover, since the cursor is discretely moved according to the number of times keys are pressed, successive image search, successive screen changing, and the like cannot be executed.

In order to overcome the above problem, there is proposed an input device enabling the cursor to successively move using a touch panel. However, even in this case, since the touch panel has limited possible feedback with an actual physical input by the user, precise control is difficult.

SUMMARY OF THE INVENTION

Accordingly, the present invention is directed to an input device of a mobile communication terminal capable of successively and rapidly performing a variety of functions and a mobile communication terminal using the same that substantially obviate one or more problems due to limitations and disadvantages of the related art.

An object of the present invention is to provide an input device of a mobile communication terminal capable of successively and rapidly performing a variety of functions and a mobile communication terminal using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an input device of a mobile communication terminal includes a belt being successively slidable by an external force, a plurality of rollers being rotated by the sliding of the belt, a sensor unit for detecting the rotation of the roller, and a controller for executing at least one function according to an electric signal generated from the sensor unit.

Preferably, the sensor unit includes a sensor emitting and receiving a light for detecting the rotation of the roller, and a reflecting member positioned at a side surface of the roller for reflecting the light.

The input device of a mobile communication terminal further includes a supporter provided to the lateral sides of the roller for the stable rotation of the roller.

Preferably, the sensor may be spaced apart from the reflecting member and provided to a side surface of the supporter facing the reflecting member.

The input device of a mobile communication terminal further includes a signal input device for generating switching signals, wherein the controller enables the selection of a specific menu according to the switching signal.

The signal input device comprises a button unit extending from the lower surface of the supporter, and a contact unit spaced apart from the button unit for generating the switching signals by contacting with the button unit in case that the roller is pressed.

Moreover, the button unit includes a fixed end, and an opposite end provided at a position spaced apart from the contact unit.

Moreover, the input device of a mobile communication terminal further includes first and second direction keys provided at the lateral sides of the belt in order to move a cursor.

The input device of mobile communication terminal further includes an electric generator for producing electricity using the rotation of the rollers.

Here, the belt is exchangeable, and the controller outputs a shortcut menu immediately when the electric signal is inputted.

In another aspect of the present invention, a mobile communication terminal includes a main body including character input keys provided on a front surface thereof, a cover including a screen for displaying an image, a belt provided to the main body or the cover, and being successively slidable by an external force, a plurality of rollers being rotated by the sliding of the belt, a sensor unit for detecting the rotation of the roller, and a controller for executing at least one function according to an electric signal generated from the sensor unit.

The sensor unit includes a reflecting member positioned at a side surface of the roller and a sensor spaced apart from the reflecting member facing the reflecting member.

The mobile communication terminal includes a supporter provided to the lateral sides of the roller for the stable rotation of the roller.

The sensor unit may include a reflecting member positioned at a side of the roller and a sensor provided to a side of the supporter facing the reflecting member.

The mobile communication terminal includes a signal input device for generating switching signals, wherein the controller enables the selection of a specific menu according to the switching signal.

The signal input device includes a button unit extending from the lower surface of the supporter, and a contact unit spaced apart from the button unit for generating the switching signals by contacting with the button unit in case that the roller is pressed.

Moreover, the mobile communication terminal further includes first and second direction keys provided at the lateral sides of the belt in order to move a cursor.

Here, the belt is exchangeable, and the controller outputs a shortcut menu immediately when the electric signal is inputted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts, and additional description for the same will be omitted.

Figure 3:
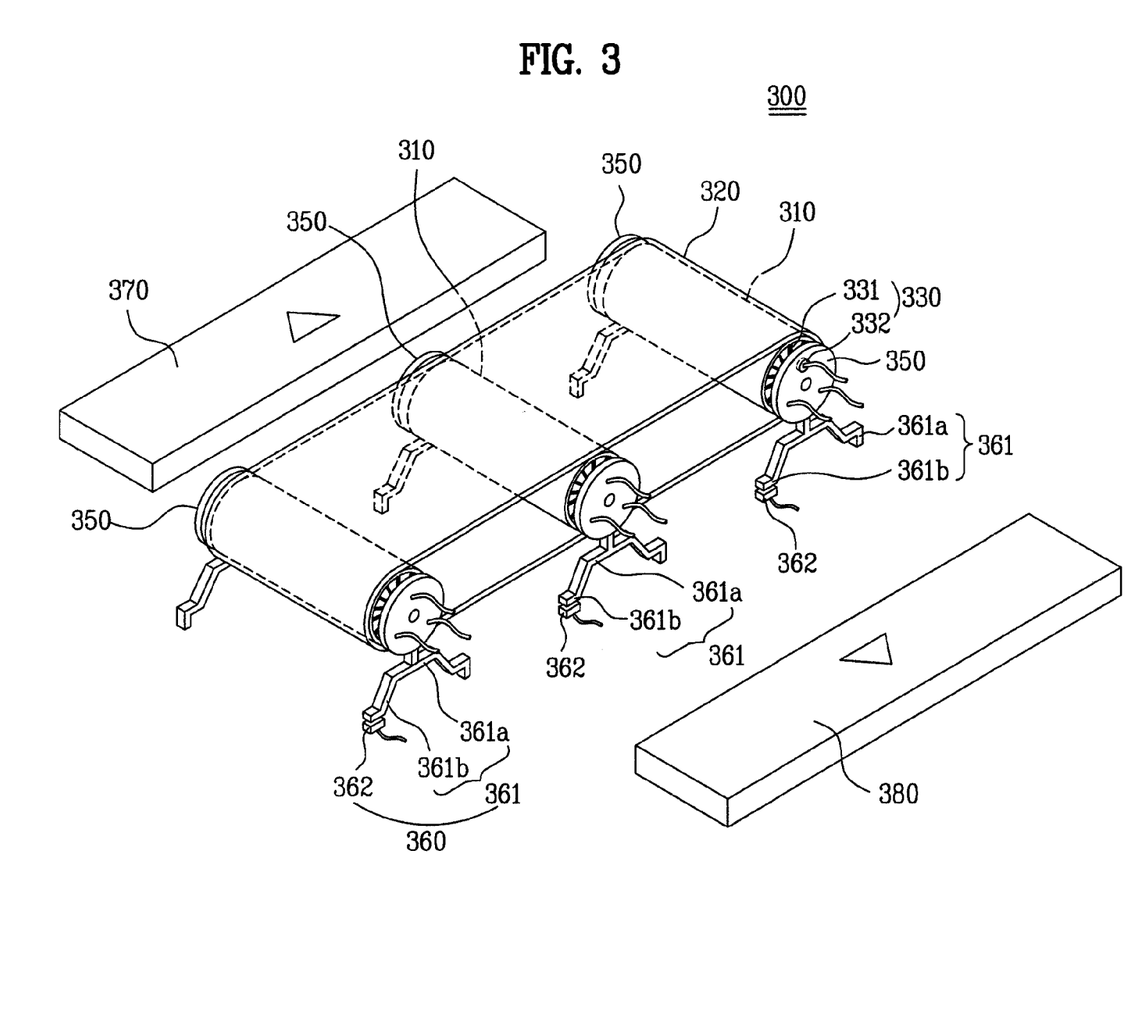
FIG. 3 illustrates an exploded perspective view of an input device of a mobile communication terminal according to a preferred embodiment of the present invention.
Figure 4:
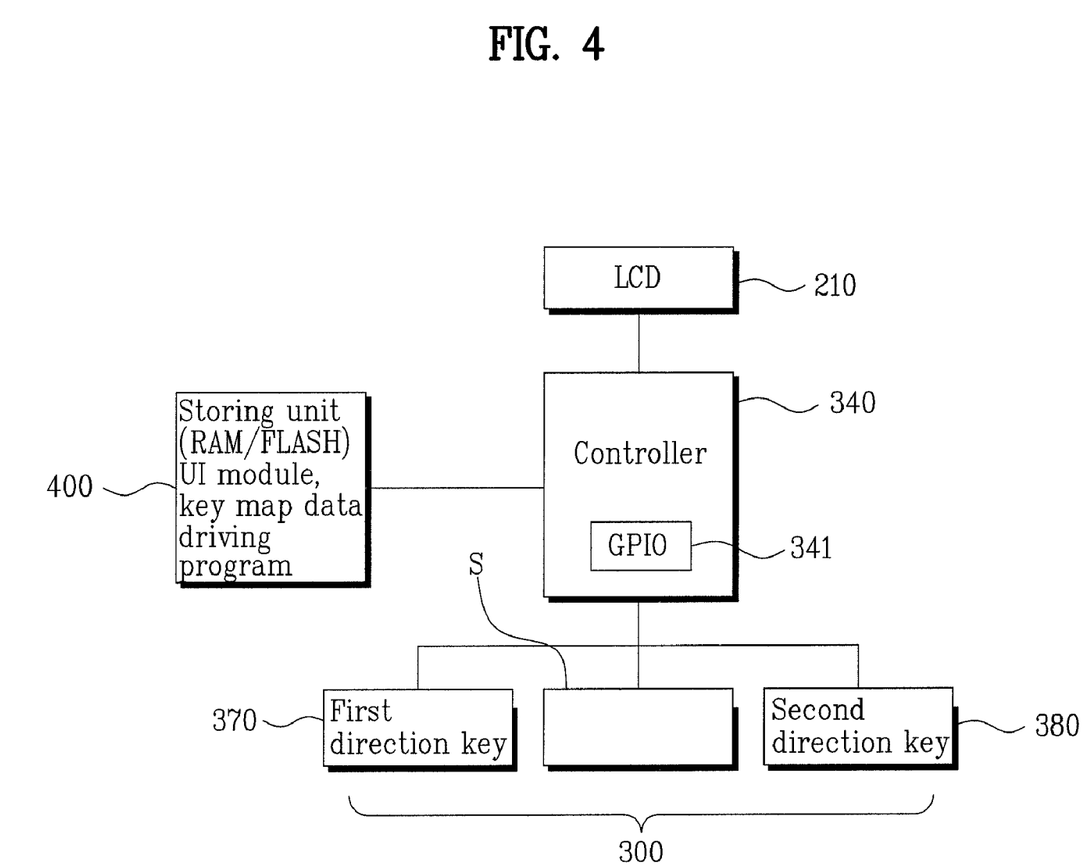
FIG. 4 illustrates a schematic block diagram of the mobile communication terminal according to the preferred embodiment of the present invention.

FIG. 3 illustrates an exploded perspective view of an input device of a mobile communication terminal according to a preferred embodiment of the present invention. FIG. 4 illustrates a schematic block diagram of the mobile communication terminal according to the preferred embodiment of the present invention.

As shown in FIG. 3 and FIG. 4, the input device 300 of the mobile communication terminal according to the preferred embodiment of the present invention includes a roller 310, a belt 320, a sensor unit 330, and a controller 340.

At least two rollers 310 are provided for being rotated. When at least two rollers 310 are provided, the rollers 310 are positioned at a predetermined distance therebetween. In detail, preferably, as shown in the drawing, three rollers 310 are provided.

The belt 320 is successively slidable by an external force and wound around the rollers 310. Therefore, when a user applies the external force to the belt 320, the rollers 310 are rotated by the sliding of the belt. In detail, when a user pushes or pulls the belt 320 with a finger, the belt 320 moves so that the rollers 310 begin to rotate due to the movement of the belt 320.

At that time, since a same force is applied to the rollers 310 by the sliding of the belt 320, all the rollers 310 begin to rotate at the same time.

The belt 320 could be detached by being taken away form the rollers. In this case, a user can exchange the present belt for a new belt having a different shape, a different color, and a different material and so on. Moreover, the user can immediately exchange the present belt for a new belt when the present belt malfunctions.

The sensor unit 330 detects the rotation of the rollers 310 and generates an electric signal. In more detail, the sensor unit 330 includes reflecting members 310 arranged at sides of the rollers 310 at a predetermined angle for reflecting a light and sensors 332 confronting the reflecting members 331.

Here, the sensors 332 are optical sensors including a light emitting device and a light receiving device respectively. The light emitting device emits the light toward the reflecting member and the reflecting member reflects the light toward the light receiving device and the light receiving device receive the reflected light. And then, the sensors generate the electric signal based on the emitted light and the received light.

Alternatively, the sensor may be comprised of a positive magnet, a negative magnet and a signal generating part. One of the positive magnet and the negative magnet is provided to a side surface of the roller, and the other is provided to a supporter facing the side surface of the roller. Therefore, the signal generating part detects the rotation of the roller by checking the interaction between the positive magnet and the negative magnet, and generates an electric signal according to the rotation of the roller.

The number of the sensor units 330 may be identical to the number of the rollers 310. However, since the rollers 310 are simultaneously rotated by the belt 320, only one sensor unit 330 could be provided.

At the lateral sides of the rollers 310, circular plate supporters 350 may be provided for the stable rotation of the rollers 310. In this case, the sensors 332 are provided to lateral sides of the supporters 350 confronting the reflecting members 331.

The controller 340 executes a variety of functions provided to the mobile communication terminal according to a signal generated from the sensor unit 330.

In detail, the controller 340 executes a variety of functions such as a successive movement of a cursor, an enlargement/ reduction of a screen, a turning a page of an electronic publication, a change of reproducing position of a multi-media play, and the like according to the electric signals.

Meanwhile, in the lower sides of the supporters 350, signal input devices 360 are provided for generating switching signals when an external force is applied vertically to the rollers 310.

Each of the signal input device 360 includes a button unit 361 extended from the lower side of the supporter 350, and a contact unit 362 fixed at a predetermined distance from the button unit 361 for generating the switching signal by contacting with the button unit 361 when the external force is applied vertically to the rollers 310.

Here, an end 361*a* of the button unit 361 is fixed and the opposite end 361*b* thereof is provided at a position spaced apart from the contact unit 362.

Thus, when the rollers 310 have a vertical external force applied thereto, in other words, the user presses the rollers 310, the supporters 350 move down together with the rollers 310 so that the external force is exerted on the button units 361 provided to the lower sides of the supporters 350.

At that time, since the end 361*a* of the button unit is fixed, only the opposite end 361*b* of the button unit moves down. Thus, the opposite end 361*b* of the button unit 361 contacts the contact unit 362 and the contact unit 362 generates the switching signal.

Here, the switching signal generated from the signal input device 360 is transmitted to the controller 340, and the controller 340 executes a specific function according to the switching signal.

In detail, when the switching signal is inputted, the controller 340 executes a function of a menu where the cursor is positioned. As such, when the user presses the rollers 310, according to the switching signal generated from the signal input device 360, the controller 340 executes a function of a specific menu. Thus, the rollers 310 associated with the signal input device 360 serve as an enter key.

The signal input devices 360 may be provided to the supporters 350 respectively.

Meanwhile, first and second direction keys 370 and 380 are provided to the sides of the belt 320. The first and second direction keys 370 and 380 are provided for moving the cursor such as conventional arrow keys.

Moreover, the input device includes an electric generator (not shown) for generating electricity using the rotation of the rollers 310.

The electric generator may be implemented in various manners, for example, the electric generator includes a permanent magnet and a coil. The permanent magnet is provided to a shaft of the roller 310 and a coil provided to a hole of the supporter 350 with which the shaft is coupled.

As such, when the electric generator generates electricity using the rotation of the rollers 310, necessary electric power can be supplied even in case of a power failure, and moreover, since simple functions can be executed by the electric power supplied from the electric generator, the lifespan of a battery of the mobile communication terminal can be prolonged.

A sequence of the user executing a desired function using the input device of the mobile communication terminal according to the preferred embodiment of the present invention will be described in brief as follows.

Firstly, when the user pushes or pulls the belt 320, the sensor unit 330 generates an electric signal due to the rotation of the roller 310. Moreover, when the user presses the roller 310, the button unit 361 provided to the lower side of the supporter 350 contacts the contact unit 362 for generating a switching signal.

The electric signal generated from the sensor unit 330 and the switching signal generated from the signal input device 360 are transmitted to the controller 340.

At that time, the controller 340 receives the signals through an input interface 341 including a GPIO (general purpose input/output pin) and interprets a control command of a corresponding key value using key map data stored in a storing unit 400.

After that, the controller 340 reads a driving program corresponding to the control command from the storing unit 400 by using the interpreted control command and executes the variety of functions as described above.

In other words, when the electric signal generated from the sensor unit 330 is inputted, the controller 340 executes the functions such as the successive movement of a cursor, the enlargement/reduction of a screen, or the like, and executes the function of a menu where the cursor is positioned by the switching signal's input.

Here, whether the driving program is operated or not is displayed on a screen such as an LCD for user's checking.

As such, the user can execute a variety of functions as described above by simply moving the belt 320 or pressing the rollers 320. A numeral S is assigned to the rest of the input device 300 except for the first and second direction keys 370 and 380.

Meanwhile, the input device 300 may be provided to the mobile communication terminal in various configurations.

Figure 5:
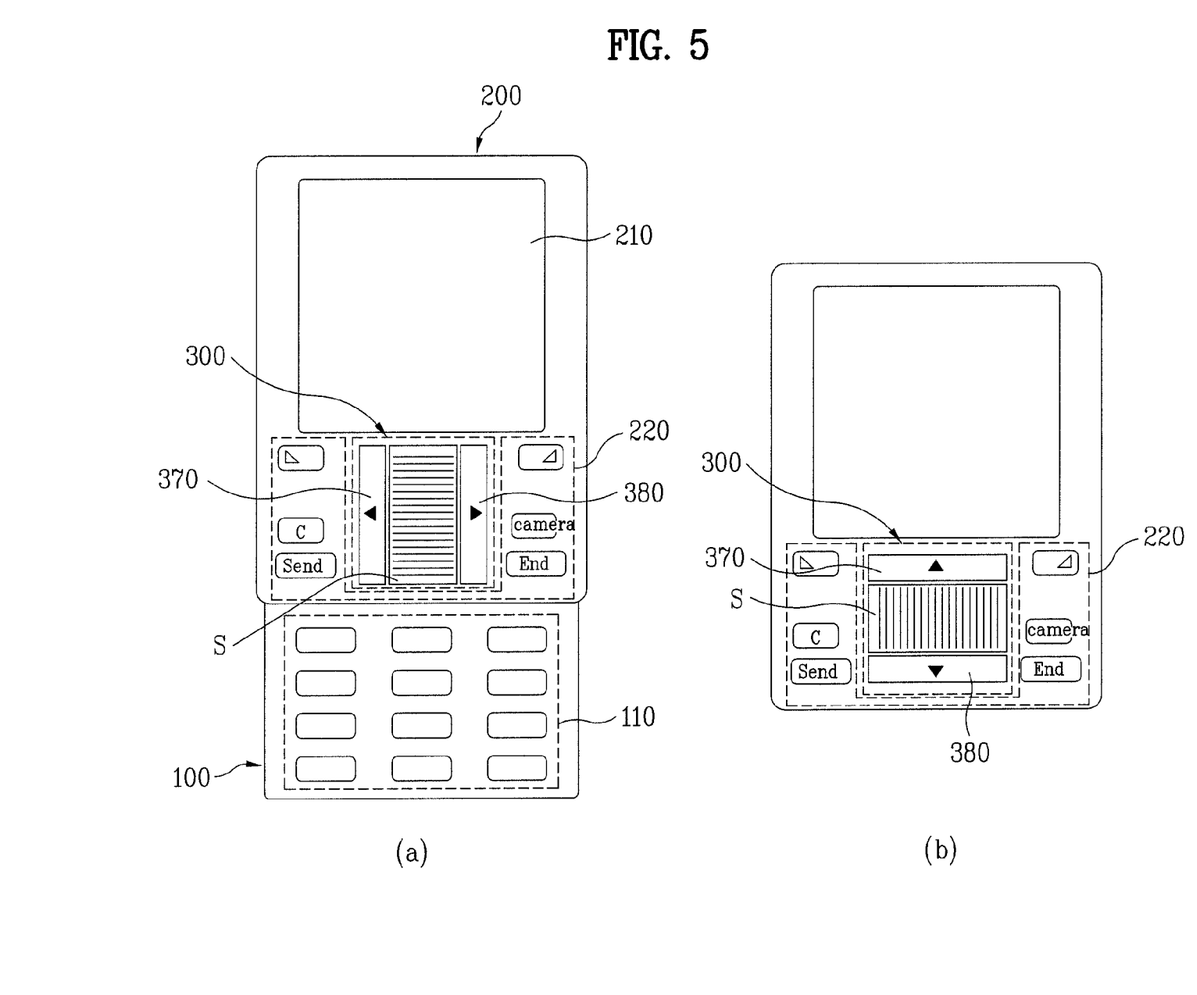
FIG. 5 illustrates a front view of the mobile communication terminal according to the preferred embodiment of the present invention.

FIG. 5 illustrates a front view of the mobile communication terminal according to the preferred embodiment of the present invention.

As shown in FIG. 5*a*, the mobile communication terminal according to the preferred embodiment of the present invention roughly includes a main body 100 including character input keys 110 provided to the front side thereof, a cover 200 including a display screen 210 for displaying an image and shortcut keys 220 for driving a camera and etc., and the input device 300.

Here, the input device 300 may be provided to the main body 100 or the cover 200 according to types of the mobile communication terminal. In other words, in the case of a slide type mobile communication terminal as shown in FIG. 5, the input device 300 is provided to the cover 200, and in the case of a folder type mobile communication terminal as shown in FIG. 1, the input device 300 is provided to the main body 100.

Moreover, the input device 300 is installed to the mobile communication terminal in the vertical direction. In this case, the first direction key 370 serves as a direction key for moving the cursor left direction, and the second direction key 380 serves as a direction key for moving the cursor right direction.

Naturally, the input device 300, as shown in FIG. 5*b*, may be installed to the mobile communication terminal in the transversal direction. In this case, the first direction key 370 serves as a direction key for moving the cursor upward, and the second direction key 380 serves as a direction key for moving the cursor downward.

Finally, the functions executed by the input device of the mobile communication terminal according to the preferred embodiment of the present invention will be described in more detail with reference to FIGS. 6 to 10.

FIGS. 6 to 10 are views illustrating the functions executed by the input device of the mobile communication terminal according to the preferred embodiment of the present invention.

Figure 6:
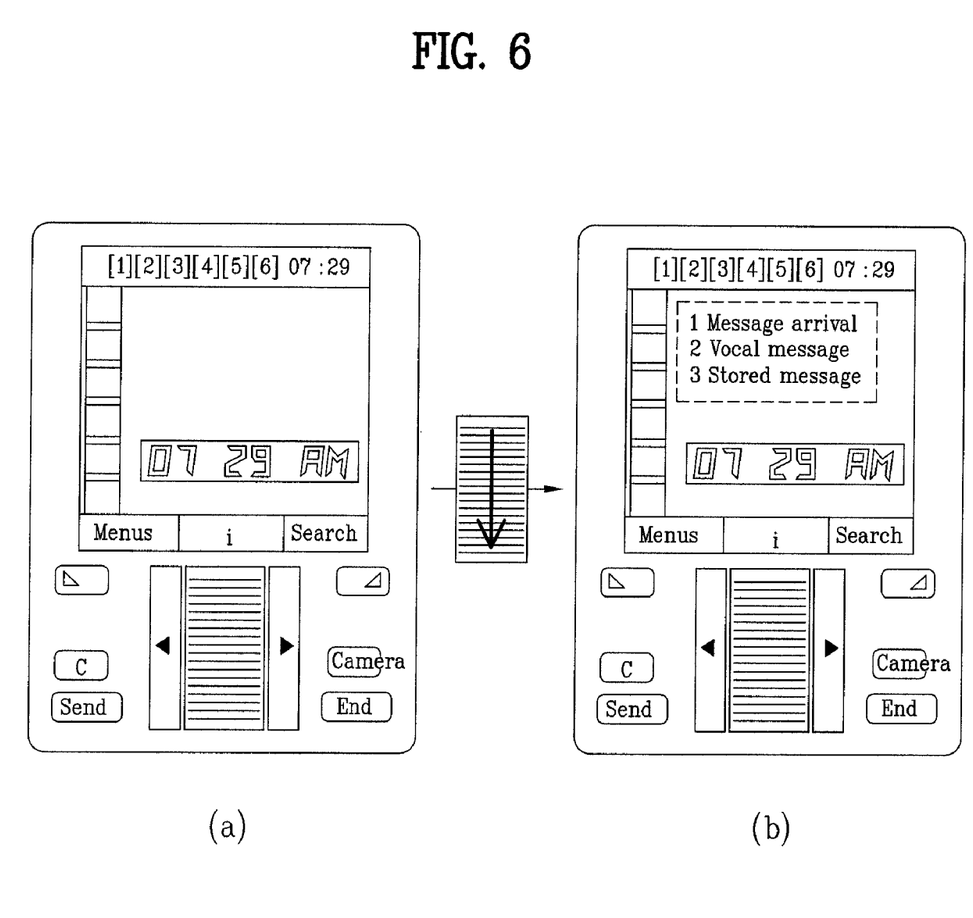
FIGS. 6 to 10 are views illustrating functions executed by the input device of the mobile communication terminal according to the preferred embodiment of the present invention.

As shown in FIG. 6, in the initial stage, when the user moves the belt 320, a shortcut menu such as a message arrival is immediately outputted on the screen.

In other words, when the user moves the belt 320 for rotating the rollers 310, the controller 340 firstly outputs the shortcut menu on the screen. At that time, the cursor can be positioned at the first position of the shortcut menu.

Further, when the shortcut menu is outputted on the screen, the user moves the belt 320 again such that the cursor positioned at the shortcut menu is moved to a desired menu.

As such, when the shortcut menu is outputted on the screen simultaneously with moving the belt 320, there is no need to press a specific menu key for the purpose of selecting the shortcut menu in the conventional mobile communication terminal.

Figure 7:
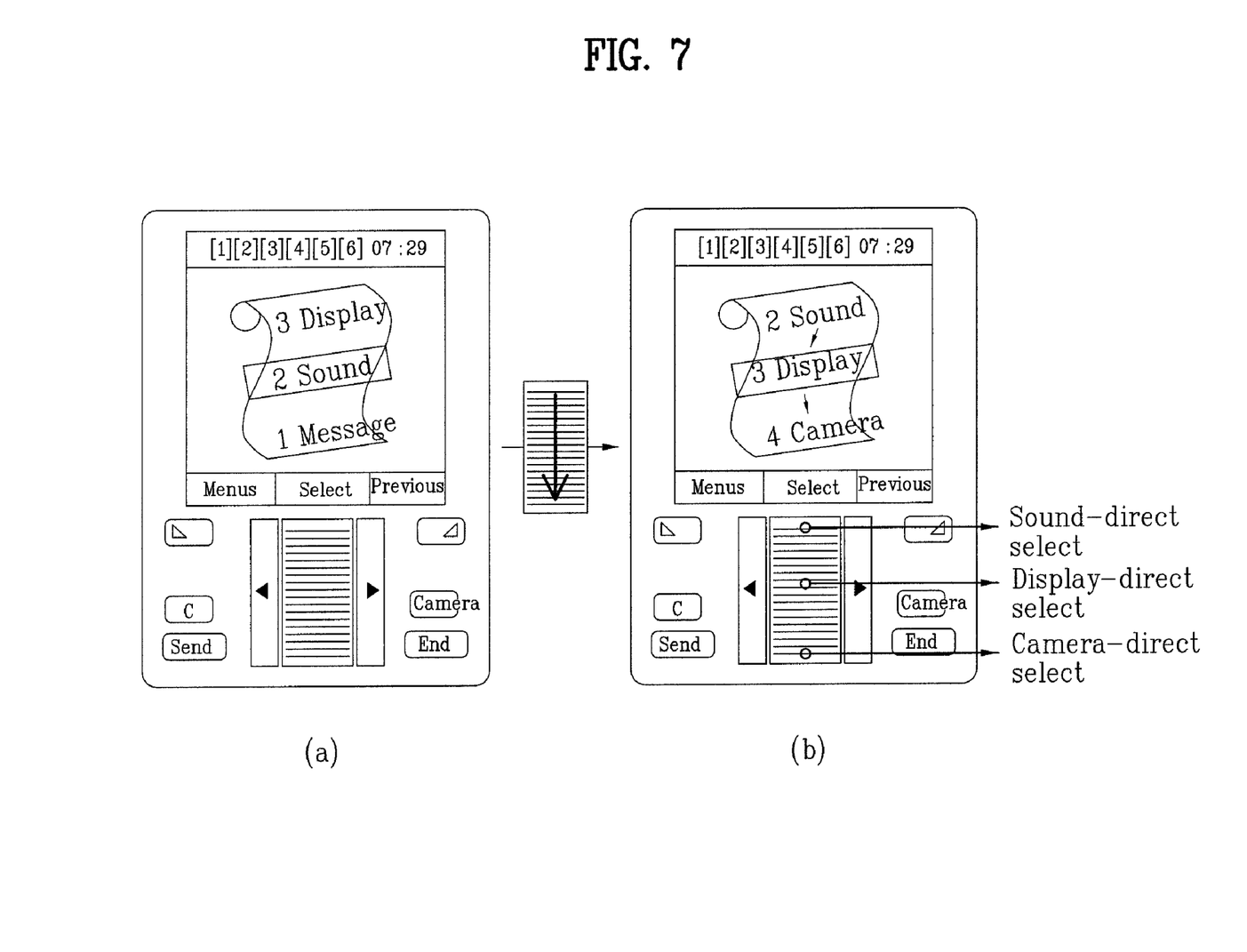

Next, as shown in FIG. 7, when the user moves the belt 320, the menu displayed on the screen to be selected is changed. In other words, when the user moves the belt 320, the cursor moves and the menus displayed on the screen are sequentially selected.

At that time, when the signal input device 360 is provided to the mobile communication terminal, the user presses the roller 310 so that the menu where the cursor is positioned can be immediately selected. The user presses the roller 310 such that the contact unit 363 contacts the button unit 361b for generating switching signal. And then, the function of the menu where the cursor is positioned is immediately executed by the controller 340. Thus, the rollers 310 associated with the signal input device 360 serve as an enter key.

As such, the user could move the belt 320 for selecting the menu and press the roller 310 so that the selected menu is immediately executed.

The operations of moving the belt 320 and pressing the roller 310 can be simultaneously executed. Thus, the user can rapidly select and execute a desired menu using the input device.

Meanwhile, as shown in FIG. 7b, the mobile communication terminal includes three of the rollers 310, signal input device 360 and the LCD screen. The menus displayed on the screen are SOUND, DISPLAY, and CAMERA. The mobile communication terminal can be operated such that when the uppermost roller 310 is pressed, the menu of SOUND is selected, when the intermediate roller 310 is pressed, the menu of DISPLAY is selected, and when the lowermost roller 310 is pressed, the menu of CAMERA is selected.

In that case, the three rollers 310 serve as three shortcut keys for executing the selections of menus such as SOUND, DISPLAY, and CAMERA.

Figure 8:
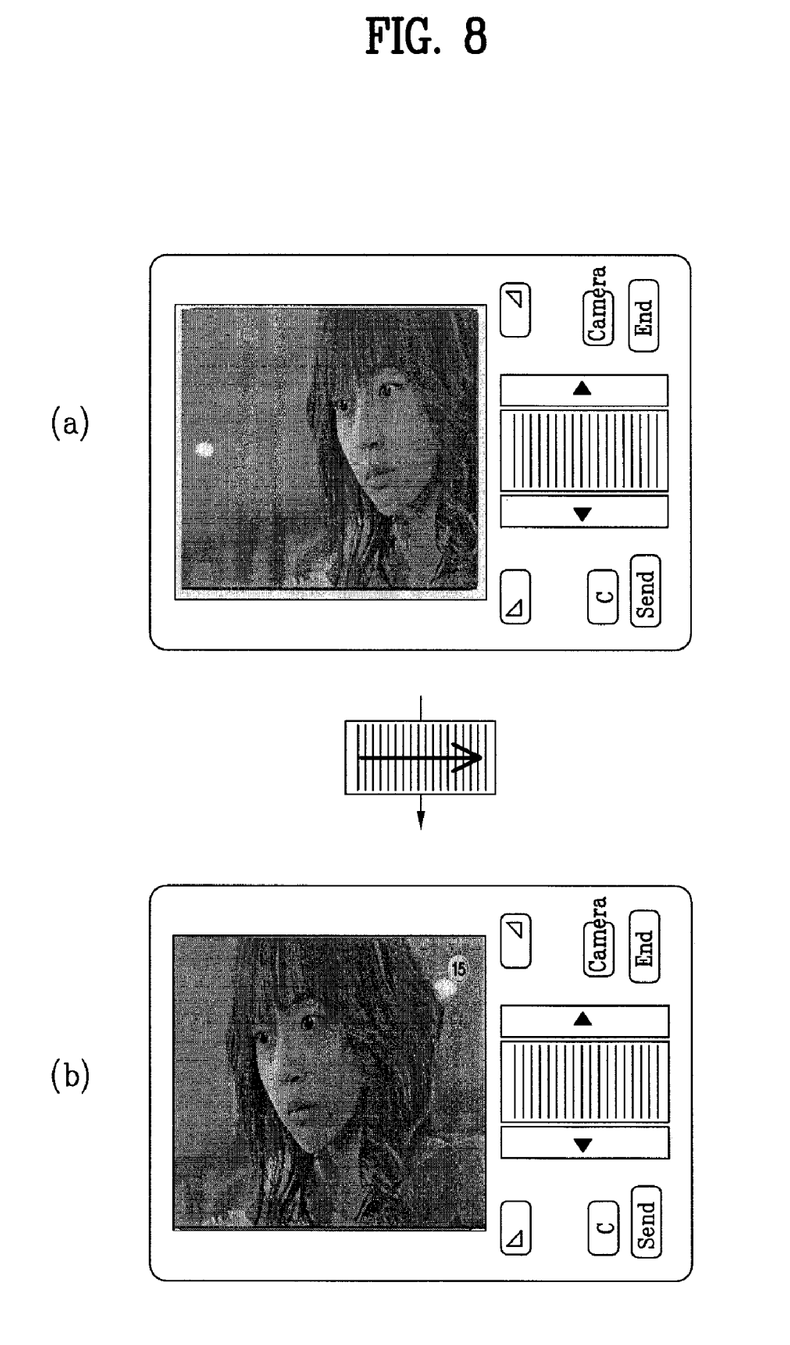

Next, as shown in FIG. 8, the user can enlarge or reduce an image displayed on the screen using the input device 300 as well as can move the screen upward and downward.

Since the enlargement/reduction and the movement of an image are performed by the user pushing or pulling the belt 320, these functions are more conveniently and rapidly performed than when using the conventional arrow keys.

Moreover, the user can perform a variety of functions such as the movement of a lens of a camera for capturing an image, the change of an angle of the lens, the capturing in a panorama capturing mode, or the like by using the input device.

Figure 9:
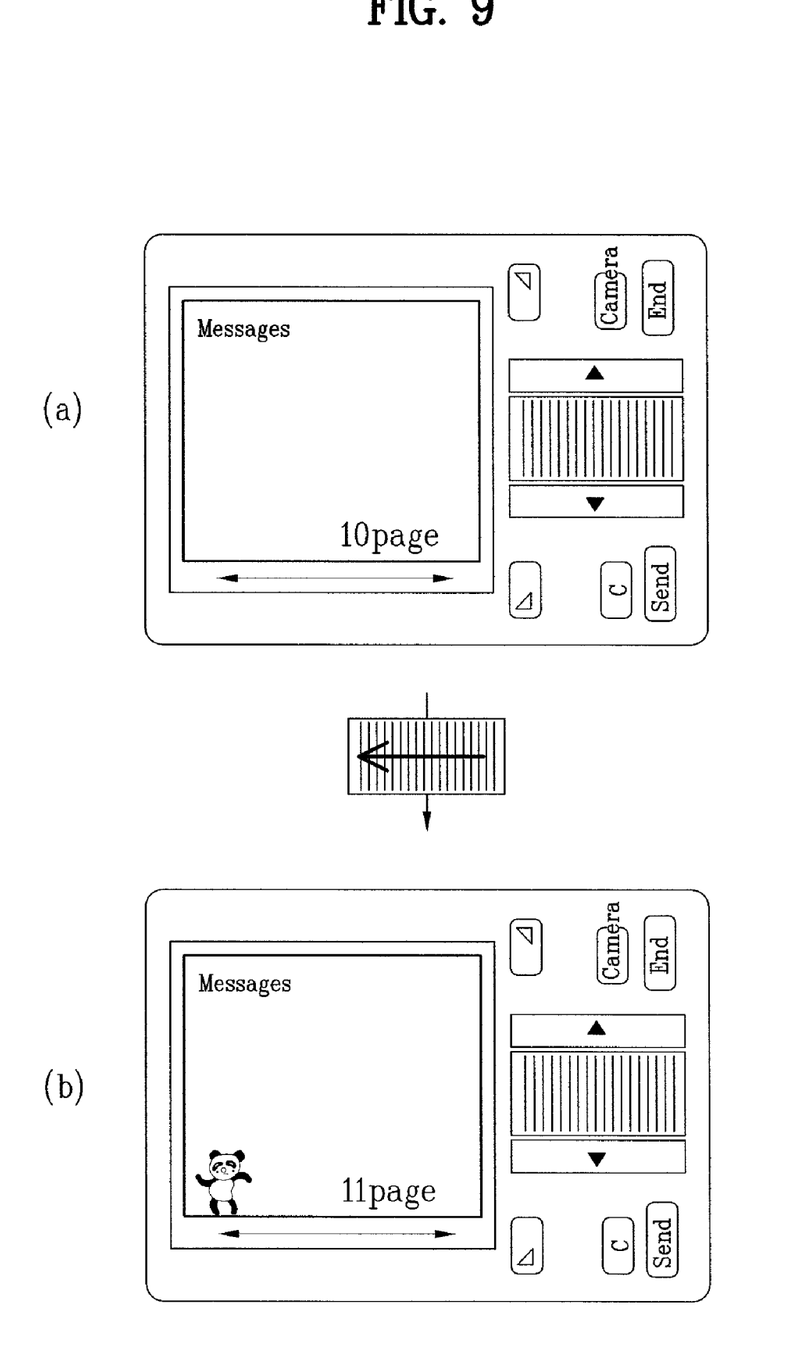
Figure 10:
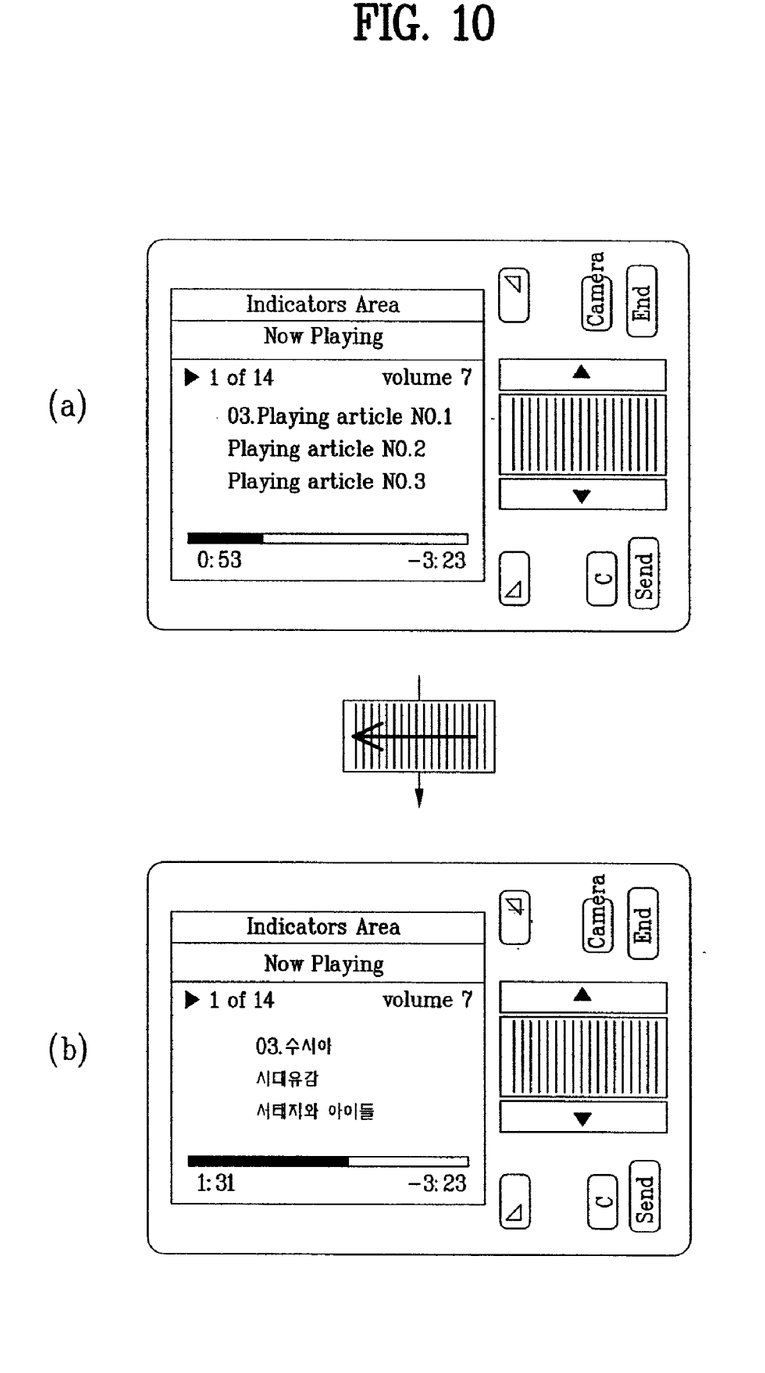

Finally, as shown in FIGS. 9 and 10, the user can turn a page of an electronic book using the input device 300 or move a displaying position of a file to be displayed by a multimedia player.

In other words, by simply pushing or pulling the belt 320, the user can search a desired page of the electronic book or a displaying position of a music file or a movie file which the user wishes to listen and/or to watch.

Moreover, in the multimedia player, the user pushes or pulls the belt 320 for playing the file in the forward or backward direction at a low or high speed.

As described above, the input device of the mobile communication terminal according to the present invention has advantages as follows.

Firstly, the input device of the mobile communication terminal according to the present invention can provide an analog feedback to the controller through the sensor unit for the successive and rapid execution of a menu.

In other words, the input device of the mobile communication terminal of the present invention can implement the successive and rapid menu search easily when a user searches a great deal of data or menus in a mobile communication terminal such as a personal digital assistant (PDA), a palmtop computer having a communication function, and a multifunctional mobile phone.

Secondly, since the roller serves as an enter key when the input device of the mobile communication terminal of the present invention includes the signal input device, the manipulation for the execution of the functions is more convenient than the conventional device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An input device of a mobile communication terminal, the input device comprising:
   a belt being successively slidable by an external force;
   a plurality of rollers being rotated by the sliding of the belt;
   a sensor unit for detecting the rotation of the roller;
   a supporter provided to the lateral sides of the roller for the stable rotation of the roller; and
   a controller for executing at least one function according to an electric signal generated from the sensor unit; and
   a signal input device for generating switching signals, wherein the controller enables the selection of a specific menu according to the switching signal, the signal input device including:
   a button unit extending from the lower surface of the supporter; and
   a contact unit spaced apart from the button unit for generating the switching signals by contacting with the button unit when the roller is pressed.

2. The input device of a mobile communication terminal as set forth in claim 1, wherein the sensor unit comprises:
   a sensor emitting and receiving a light for detecting the rotation of the roller; and
   a reflecting member positioned at a side surface of the roller for reflecting the light.

3. The input device of a mobile communication terminal as set forth in claim 1, wherein the sensor unit comprises:
   a reflecting member positioned at a side surface of the roller; and
   a sensor provided to a side of the supporter facing the reflecting member.

4. The input device of a mobile communication terminal as set forth in claim 1, wherein the button unit comprises:
   a fixed end; and
   an opposite end provided at a position spaced apart from the contact unit.

5. The input device of a mobile communication terminal as set forth in claim 1, further comprising first and second direction keys provided at the lateral sides of the belt in order to move a cursor.

6. The input device of a mobile communication terminal as set forth in claim 1, further comprising an electric generator for producing electricity using the rotation of the roller.

7. The input device of a mobile communication terminal as set forth in claim 1, wherein the belt is exchangeable.

8. The input device of a mobile communication terminal as set forth in claim 1, wherein the controller outputs a shortcut menu when the electric signal is inputted.

9. A mobile communication terminal comprising:
a main body including character input keys provided on a front surface thereof;
a cover including a screen for displaying an image;
a belt provided to the main body or the cover, and being successively slidable by an external force;
a plurality of rollers being rotated by the sliding of the belt;
a supporter provided to the lateral sides of the roller for the stable rotation of the roller;
a sensor unit for detecting the rotation of the roller; and
a controller for executing at least one function according to an electric signal generated from the sensor unit; and
a signal input device for generating switching signals, wherein the controller enables the selection of a specific menu according to the switching signal, the signal input device including:
a button unit extending from the lower side of the supporter; and
a contact unit spaced apart from the button unit for generating the switching signals by contacting with the button unit, in case that the roller is pressed.

10. The mobile communication terminal as set forth in claim 9, wherein the sensor unit comprises:
a reflecting member positioned at a side surface of the roller; and,
a sensor spaced apart from the reflecting member facing the reflecting member.

11. The mobile communication terminal as set forth in claim 9, wherein the sensor unit comprises:
a reflecting member positioned at a side surface of the roller; and
a sensor provided to a side of the supporter facing the reflecting member.

12. The mobile communication terminal as set forth in claim 9, further comprising first and second direction keys provided at the lateral sides of the belt in order to move a cursor.

13. The mobile communication terminal as set forth in claim 9, wherein the belt is exchangeable.

14. The mobile communication terminal as set forth in claim 9, wherein the controller outputs a shortcut menu immediately when the electric signal is inputted.

15. A mobile communication terminal comprising:
a main body having a character input keys provided on a front surface thereof;
a cover assembled to the front surface of the main body to make a slide motion, the cover having a screen provided on the front surface thereof in order to display an image;
an input device provided on the front surface of the cover, the input device having a first and a second direction keys and a roller disposed between the first and the second direction keys in order to be rotated on a rotational axis paralleled to the front surface of the cover;
a sensor unit for detecting a first rotation of the roller and a second rotation of the roller;
a controller for executing at least one function according to an electric signal generated from the sensor unit; and
a signal input device for generating a switching signals when the roller is pressed, wherein the controller outputs a shortcut menu to the screen when the sensor unit detects the first rotation of the roller,
wherein the controller positions a cursor in the short cut menu when the sensor unit detects the second rotation of the roller,
wherein the shortcut menu item associated with a position of the cursor in the shortcut menu is selected when a pressing of the roller is detected, and
wherein the pressing of the roller generates a switching signal and the controller executes a function associated with the shortcut menu item according to the switching signal.

16. The mobile communication terminal of claim 15, wherein the width of the input device is smaller than that of the screen.

17. The mobile communication terminal of claim 15, wherein the at least one function includes enlarging an image on a screen when the sensor unit detects the rotation in a first direction and reducing the image on the screen when the sensor unit detects the rotation in a second direction.

18. The mobile communication terminal of claim 15, wherein the at least one function includes turning a page of an electronic book when the sensor unit detects the rotation of the roller.

19. The mobile communication terminal of claim 15, wherein the at least one function includes moving a displaying position of a file to be displayed by the mobile communication terminal when the sensor unit detects the rotation of the roller.

* * * * *